United States Patent [19]

Parrent, Jr. et al.

[11] 4,118,107

[45] Oct. 3, 1978

[54] OPTICAL DETECTION OF GEOMETRIC CONFIGURATIONS

[75] Inventors: George B. Parrent, Jr., Carlisle; John H. Ward, Billerica, both of Mass.

[73] Assignee: Technical Operations, Incorporated, Boston, Mass.

[21] Appl. No.: 521,750

[22] Filed: Jan. 19, 1966

[51] Int. Cl.² .............................................. G02B 5/18
[52] U.S. Cl. .................................. 350/162 SF; 356/71
[58] Field of Search ......... 350/311, 314, 316, 162 SF; 88/24, 8, 19; 356/71

[56] References Cited

U.S. PATENT DOCUMENTS 3,090,281   5/1963   Marachel et al. .................... 88/24

OTHER PUBLICATIONS

Cutrona et al., *Filtering Operations Using Coherent Optics*, reprinted from vol. XV, Proceedings of the National Electronics Conference, pp. 1–14, Oct., 1959.

Armitage et al., *Absolute Contrast Enhancement*, in Applied Optics, vol. 4, No. 4, Apr., 1965, pp. 445–451.

*Primary Examiner*—Verlin R. Pendegrass
*Attorney, Agent, or Firm*—Wolf, Greenfield & Sacks

[57] ABSTRACT

The specification discloses an optical technique for retrieving images of geometric shapes from a cluttered background in a photographic record by means of amplitude and phase filters configured according to the particular shape sought to be retrieved. A Fourier transform of the record is filtered with filters of both types and light representing the desired shape, if present, is brought to a focus in an image plane.

9 Claims, 13 Drawing Figures

GEORGE B. PARRENT, JR.
JOHN H. WARD
INVENTORS

ATTORNEYS

GEORGE B. PARRENT, JR.
JOHN H. WARD
INVENTORS

Alfred H. Rosen
Thomas N. Tarrant
ATTORNEYS

OPTICAL DETECTION OF GEOMETRIC CONFIGURATIONS

This invention relates to the detection of optical signals of predetermined configuration against a cluttered background. In particular, it relates to the use of complex spatial filtering techniques in a coherent optical system for locating objects of a given geometric configuration.

In large scale aerial mapping or military photographic reconnaissance it is frequently desirable to locate on the film artificial objects of known size and shape. An artificial object normally stands out against a completely natural background but can become difficult to detect in backgrounds containing many artificial objects. In large scale mapping the area of map detail can become so great and the contrast so low that visual location of such objects becomes very tedious and time consuming. Thus it would be very desirable to automatically process film in a way to pinpoint objects having known configurations.

In accordance with the present invention it has been found that complex spatial filtering in the Fourier transform plane of a coherent optical system can be used to selectively focus to a spot only light transmitted from a target (photographic transparency) that represents predetermined symmetrical or near symmetrical configurations. Thus it is an object of the invention to define novel means for locating geometrical objects in a cluttered background. It is a further object of the invention to define spatial filter means providing the inverse Fourier transform of an optical signal. It is still a further object to define a method for spatial filtering the Fourier transform of a photographic image to locate geometrical objects in the image.

Further objects and features of the invention will become apparent on reading the following specification with reference to the illustrations in which.

Figure 4:
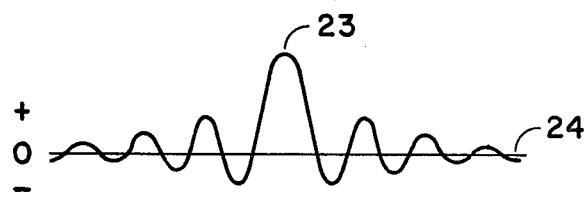

FIG. 4 is a graphical representation of light amplitude and phase at plane 15 produced by illumination of aperture 18 in plane 12.

Figure 5:
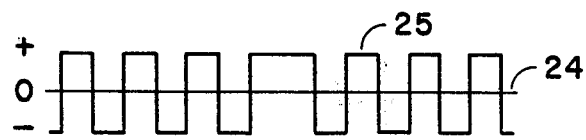

FIG. 5 is a graphical representation of light amplitude and phase after passing through filter 19 in plane 15.

Figure 6:
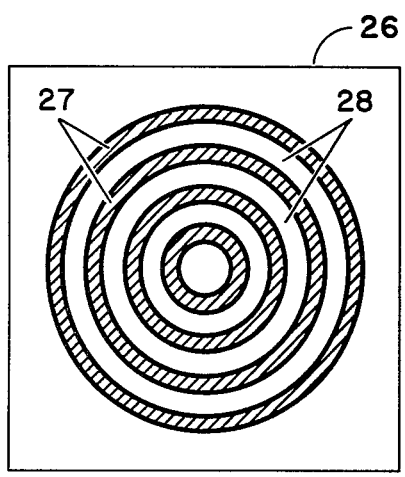

FIG. 6 is a phase filter for cancelling the phase reversals of FIG. 5.

FIGS. 7 to 12 are amplitude and phase filters for a series of geometric configurations.

Figure 13:
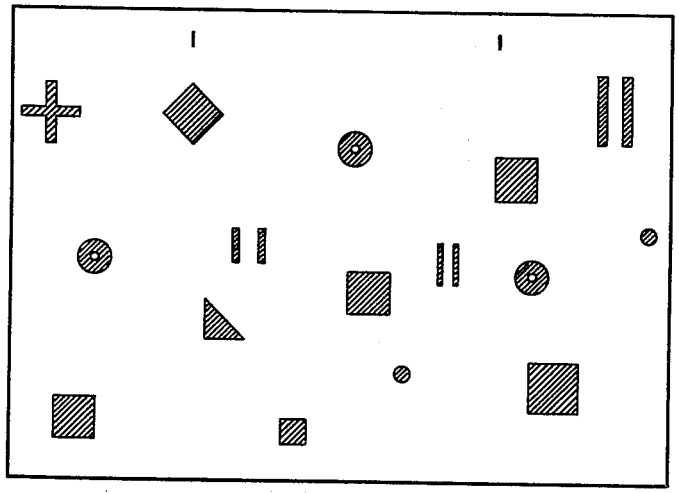

FIG. 13 is a cluttered photograph with superimposed location detection spots obtained in accordance with the invention.

Figure 1:
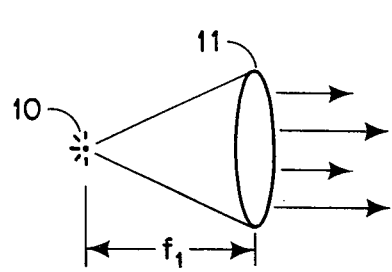
FIG. 1 is a schematic of a basic spatial filtering optical system.
Figure 1:
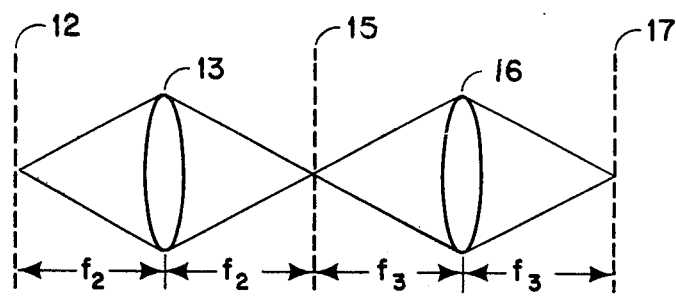

The basic spatial filtering optical system is known and is illustrated in FIG. 1 for descriptive purposes. The figure shows quasi-monochromatic, small light source 10 illuminating collimating lens 11. Object plane 12 is indicated by a dashed line at the front focal plane of a transform lens 13. Spatial filter plane 15 is indicated by a dashed line at the back focal plane of lens 13. Plane 15 is also the Fourier transform plane for a transparent target positioned in object plane 12. Retransform lens 16 is positioned one focal length in back of filter plane 15 and image plane 17 is indicated by a dashed line at the back focal plane of lens 16.

The illumination bandwidth and the size of source 10 are such that areas of individual signal object size are coherently illuminated, i.e. over the dimensions of any signal object there will be no substantial variation in the phase front of the illumination. Lenses 13 and 16 are suitably convex lenses and the terms transform and retransform are used to denote their functions. Lens 13 produces a two-dimensional spatial Fourier transform of the target in filter plane 15 and lens 16 produces an inverted image of the target at image plane 17.

The general spatial filtering problem is discussed by E. L. O'Neill in "Introduction to Statistical Optics," Addison-Wesley Publishing Company, 1963; and "Selected Topics in Optics and Communications Theory," Boston University Physical Research Laboratories, Technical Note No. 133, October 1957.

The amplitude of the optical disturbance in the filter plane is in general, a complex function having a continuous phase variation. Most spatial filtering has been limited in the past to operations on the amplitude of the disturbance in the filter plane. Much better control over the appearance of the image in image plane 17 is possible if both phase and amplitude of the Fourier compounds are operated on. The construction of the appropriate filter particularly the phase part, is the most difficult problem in spatial filtering.

According to the present invention, signals representative of a given size and geometric shape are operated on by spatial filters in a Fourier transform plane. The filters operate to convert such signals to effectively uniform illumination leaving that plane. The result is to turn the light representative of that signal back to its original condition as a uniform plane wave front in the filter plane which is then focussed to a point at the back focal plane of lens 16 in the inverted image position relative to the original signal object. The ideal spatial filter to accomplish this should have a transmission function that is the inverse of the Fourier transform of the given geometric configuration. Both amplitude and phase filters are required.

Figure 2:
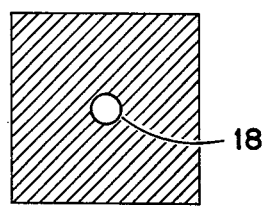
FIG. 2 is a front elevation of an aperture plate having an aperture of a selected size and geometric shape.

The amplitude filter is readily made. An aperture or transparency carrying an image of the desired shape and size is placed in target plane 12 of the system in FIG. 1. FIG. 2 depicts a circular aperture 18 used for making the amplitude filter to detect and locate circular objects of the same size.

Figure 3:
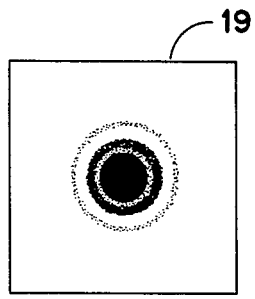
FIG. 3 is a front elevation of a photographic negative formed in plane 15 of the FIG. 1 optical system by illumination through the aperture plate of FIG. 2 positioned in plane 12.

Photographic film is placed in transform plane 15 and is exposed to the Fourier transform of the given geometric configuration, i.e., circular aperture 18. The film is developed as a negative transparency to serve as the amplitude filter. FIG. 3 illustrates the appearance of the amplitude filter for a circle. This filter will introduce some small phase variations which should be minimized. A liquid gate is one method of minimizing such phase variations. The phase filter is necessary to correct for the phase reversals in the Fourier transform. FIG. 4 is a curve representing the variation in light amplitude along a line through the Fourier transform typical of a circle. Line 23 represents light amplitude and line 24 represents the zero axis of no amplitude. Portions of curve 23 below line 24 represent amplitude of the opposite phase polarity relative to amplitude above line 24.

The amplitude filter described above will average the curve out without correcting for phase to produce an amplitude pattern something like FIG. 5.

The variations in curve 25 of FIG. 5 represent phase variations with no amplitude variation. Correction for these phase changes is obtained by a π phase reversal for the portions below zero line 24 relative to the portions above the line. One way of doing this is to examine the negative used for the amplitude filter. The image on this negative will consist of some type of progression of relative transparency and opacity. The dark center of each area is an intensity peak and the central area for a circle has a diameter twice the width of each of the other areas.

Each area of a given phase can be measured to midpoints of highest transparency adjacent opposite sides of an opacity peak. The phase filter is then designed to provide π phase reversals between alternate areas. FIG. 6 illustrates a phase filter 26 to match amplitude filter 19 of FIG. 3. In FIG. 6 black areas 27 represent a π shift in phase relative to plain areas 28. It is immediately apparent from the figures that the phase filter is a repetitive filter that can be extended out to any diameter by continuing the same repetition of phase shifts.

On the other hand the amplitude filter drops quickly away to no noticeable variation after a few changes from light to dark. This illustrates the sharp distinction between amplitude and phase operations that are required for the present invention.

With the amplitude filter of FIG. 3 and the phase filter of FIG. 6, circular objects, roughly corresponding to the circle of FIG. 2 can be readily detected from a heavily cluttered background or from a very low contrast image. A transparency containing images of the circular objects to be located is placed in target plane 12 and filters 19 and 26 are superimposed in the filter plane 15.

Either a screen or a photosensitive recording material is positioned in image plane 17 and the transparency is illuminated by source 10. Sharply contrasting points of light appearing in the image plane will be located at the inverted image positions relative to the desired circular object locations in the transparency.

The amplitude filter does significantly reduce the total amount of light attributable to the circular objects. However, most of this attentuation will be in the dc spot of the transform and will attenuate other signals to a similar degree. By contrast, all the light remaining attributable to the desired circular objects is focussed to a small spot while other light remains spread. The relative intensity difference makes the spots stand out sharply. Machine or visual location is simple and unambiguous.

Figure 7:
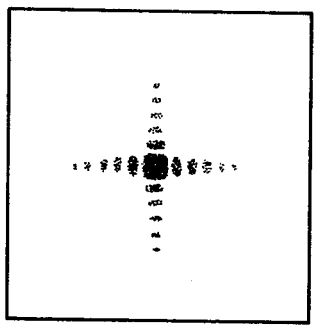
Figure 8:
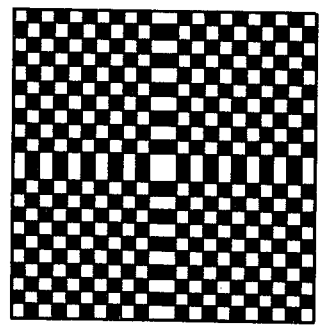
Figure 9:
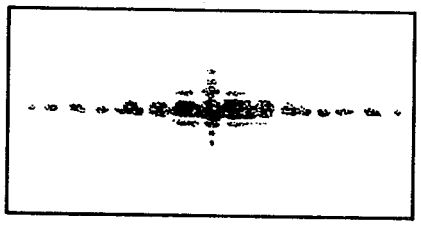
Figure 10:
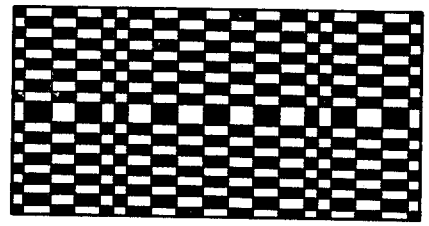
Figure 11:
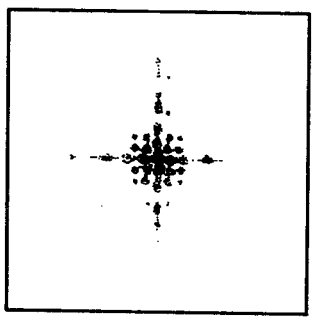
Figure 12:
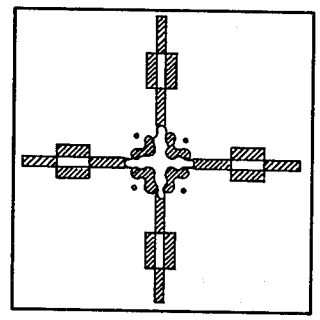

FIGS. 7 and 8 depict amplitude and phase filters for a square. FIGS. 9 and 10 depict amplitude and phase filters for two parallel lines. FIGS. 11 and 12 depict amplitude and phase filters for a cross.

All of these filters relate to geometric configurations that are symmetric about two mutually perpendicular axes. For nonsymmetrical configurations the Fourier transform becomes complex and the phase filter difficult to construct by known techniques. Phase filters of the symmetrical configurations can be designed by observation and measurement such as described above or they can be readily designed by mathematical analysis.

The system will discriminate with respect to size, shape and, in the absence of radial symmetry, angular orientation.

For precisely locating the detected configurations with respect to clutter in the targent transparency, it has been found useful to superimpose the detected spots with the target. In one example, detecting circles of a specific size, the results were photographically combined to give the picture depicted in FIG. 13. Dots 30 centered in circle 31 are the locating spots obtained in accordance with the invention.

While the configuration picture depicted in FIG. 13 can be obtained by recording the image in plane 17 and superimposing it with the original target, the system used in the present invention provides a far simpler method. By permitting some incoherent light, i.e., ambient lighting, to enter the optical system through the target along with light from source 10, an unaltered image of the target will appear in coincidence with the spot image.

While the invention has been described in relation to specific embodiments, it is not intended to be limited thereby, but to cover the invention broadly within the spirit and scope of the appended claims.

What is claimed is:

1. A spatial filter for detecting and locating a selected object configuration from background noise in a recorded image comprising:
   (a) an amplitude filter that is a (photographic) negative of the Fourier transform of an object corresponding to said selected object configuration and
   (b) a phase filter that provides π phase reversals for alternate amplitude waves of said Fourier transform.

2. A spatial filter according to claim 1 which said selected object configurations are symmetrical about at least two axes.

3. A spatial filter according to claim 1 in which said selected object configurations are circles.

4. A spatial filter according to claim 1 in which said selected object configurations are rectangles.

5. A spatial filter according to claim 1 in which said selected object configurations are parallel bars.

6. A spatial filter according to claim 1 in which said selected object configurations are a plurality of crossed bars.

7. A process for locating selected objects of predetermined configurations from an original image comprising:
   (a) coherently illuminating said image in the object plane of an optical system;
   (b) spatial filtering said image in a Fourier transform plane of said system with a filter that has the inverse transform function relative to said selected objects both as to amplitude and phase; and
   (c) forming an image in a retransform plane of said system in which light representative of said selected objects is focussed to small spots while all other light is distributed and attenuated.

8. A process for locating selected objects according to claim 7 in which said image formed in said retransform plane is superimposed with said original image so that the sharply contrasting small spots representative of said selected objects appear centered in said selected objects.

9. A process for locating selected objects according to claim 8 in which said original image is superimposed with said small spots by incoherently illuminating said original image simultaneously with said coherently illuminating.

* * * * *